United States Patent [19]

Quirk

[11] 4,374,957

[45] Feb. 22, 1983

[54] TRIBLOCK POLYMERS OF A MONOVINYL AROMATIC COMPOUND AND MYRCENE

[75] Inventor: Roderic P. Quirk, Midland, Mich.

[73] Assignee: Michigan Molecular Institute, Midland, Mich.

[21] Appl. No.: 316,299

[22] Filed: Oct. 29, 1981

[51] Int. Cl.$^3$ .......................................... C08F 297/04
[52] U.S. Cl. .................................................... 525/314
[58] Field of Search ........................................ 525/314

[56] References Cited

U.S. PATENT DOCUMENTS

| 2,383,084 | 8/1945 | Rummelsburg | 260/86 |
| 2,549,539 | 4/1951 | Sparks et al. | 260/84.1 |
| 3,231,635 | 1/1966 | Holden et al. | 260/880 |
| 3,265,765 | 8/1966 | Holden et al. | 260/876 |
| 3,784,587 | 1/1974 | Chambers | 525/314 |

OTHER PUBLICATIONS

Marvel, C. S. et al., "Polymyrcene", Journal of Polymer Science, vol. XLV, pp. 25-34, (1960).
Sivola, Arto, "The n-Butyllithium-Initiated Polymerization of Myrcene and its Copolymerization with Styrene", Acta Polytechnica Scand., Chem. Incl. Metall Ser. No. 134, 65 pp., (1977), (in English).
Quirk, R. P. et al., "Anionic Polymerization of Myrcene New Block Copolymers", Program Preprint 36th ACS Fall Scientific Meeting Midland, Mich., p. 24, Nov. 1, 1980.

Primary Examiner—Paul R. Michl
Attorney, Agent, or Firm—William Miller Yates

[57] ABSTRACT

A tacky thermoplastic elastomeric linear triblock polymer corresponding to the formula A-B-A is made from a monovinyl aromatic hydrocarbon and myrcene. A is a polymer block of a monovinyl aromatic hydrocarbon, e.g. styrene, having an average molecular weight between 2,000 and 100,000 and a glass transition temperature above 25° C. B is a polymeric block of myrcene (7-methyl-3-methylene-1,6-octadiene, $C_{10}H_{16}$) having an average molecular weight between 10,000 and 1,000,000 and a glass transition temperature below −40° C. B constitutes from 40 to 80 percent of the total. The products are made by sequential polymerization with an organolithium initiator.

3 Claims, No Drawings

TRIBLOCK POLYMERS OF A MONOVINYL AROMATIC COMPOUND AND MYRCENE

FIELD OF THE INVENTION

Thermoplastic elastomeric tacky linear triblock polymers are made from a monovinyl aromatic hydrocarbon and myrcene.

THE PRIOR ART

Polymeric products are known which are both thermoplastic and elastomeric in the unvulcanized state. In the form here relevant, they are triblock polymers of the general structure A-B-A. A is a non-elastomeric block, such as linear polystyrene, and B is an elastomeric block of a polymerized conjugated diene, e.g. polyisoprene or polybutadiene (U.S. Pat. No. 3,265,765). These products, though valuable for many purposes, do not have the property of tackiness and hence are not useful per se as adhesives.

It is also known that some trienes, such as myrcene, undergo homopolymerization (Marvel et al., J. polym. Sci. 45, 25 (1960)) and copolymerization with styrene (U.S. Pat. Nos. 2,383,084 and 2,549,539). However, myrcene, and other trienes as well, seem not to have been used heretofore in making triblock polymers.

SUMMARY OF THE INVENTION

The present invention is based on the discovery that unusual and advantageous properties may be imparted to linear triblock polymers by making the central block of polymerized myrcene. The polymers thus formed are not only thermoplastic and elastomeric but also are solvent soluble, clear, and exhibit a tacky consistency and good tensile properties.

The new materials are triblock polymers of a monovinyl aromatic hydrocarbon and myrcene corresponding to the general formula A-B-A. Each A is a polymeric block of a monovinyl aromatic hydrocarbon and B is a polymeric block of myrcene. To attain the desired properties, the molecular weight and glass transition temperature of each of the segments A and B, and the relative proportions of A and B, are all controlled within appropriate ranges, as will be described.

The products are best prepared by sequential polymerization of the monomeric components with an organolithium initiator.

The invention has the further advantage that the raw material myrcene is prepared from a renewable natural resource, e.g. turpentine, a naval store.

DETAILED DESCRIPTION OF THE INVENTION

The products of the invention are triblock polymers of a monovinyl aromatic hydrocarbon and myrcene corresponding to the general formula A-B-A. Each A is independently a block of polymeric monovinyl hydrocarbon having an average molecular weight between 2,000 and 100,000 and a glass transition temperature above 25° C. B is a polymeric block of myrcene having an average molecular weight between 10,000 and 1,000,000 and a glass transition temperature below about −40° C. The block B constitutes between about 40 and about 80 percent by weight of the total.

The new products are best made by a sequential polymerization process. In the first step, a monomeric polymerizable monovinyl aromatic hydrocarbon is contacted with an organolithium initiator until polymerization of the monomer is substantially complete. Then, in a second step, myrcene is added to the mixture resulting from the first step in a proportion by weight from about 1.3 to about 8 times that of the monovinyl compound. Polymerization occurs spontaneously and is allowed to proceed until substantially all the myrcene has polymerized, forming a second mixture. Thereafter, the same or another monomeric polymerizable monovinyl aromatic hydrocarbon is added to the second mixture, preferably in a proportion approximately equal to that in the first step. Again polymerization occurs spontaneously and is allowed to continue until substantially all the monomer has polymerized, forming a third mixture which contains the desired triblock polymer. The latter may then be recovered from the third mixture.

The polymerization process is preferably carried out by procedural techniques known and generally used for organolithium-initiated polymerizations. Reaction ordinarily takes place in the presence of an inert liquid hydrocarbon diluent or solvent for the monomer. Benzene is preferred. The proportion of diluent is not critical but it is usually in great excess, several times by volume, relative to the total of the monomers. The temperature of the reaction is also not critical but is usually in the range −20° C. to 100° C. While reaction at the higher temperatures in this range is more rapid, operation is somewhat simpler, and excellent results are obtained, at room temperature.

The reaction initiator may be any organolithium compound commonly used in the linear polymerization of unsaturated hydrocarbons. A lower alkyl lithium is convenient, with n-butyl lithium and especially sec-butyl lithium being preferred. A conventional proportion of initiator suffices, as little as will insure adequate reaction, seldom more than about 0.1 mol percent of total monomers. When polymerization to form a triblock polymer is essentially complete, it may be ended by injecting a known terminator, such as a lower alcohol or water. The triblock polymer is then recovered from the reaction mixture by standard procedures. Thus, it may be coagulated from solution in the diluent by adding a precipitant such as a lower alcohol, steam, or water. The resulting crumbs of polymer may be separated, washed, and dried.

The A component in the new tripolymers may preferably be a non-elastomeric linear homopolymeric block made from any polymerizable monomeric monovinyl aromatic hydrocarbon, preferably one of the benzene series. Typical are styrene, vinyl toluene, vinyl xylene, ethyl styrene, tert. butyl styrene, etc. Styrene itself gives excellent results and is usually chosen for commercial reasons.

The B or central component of the triblock polymer is polymerized myrcene, having a glass transition temperature below about −40° C., preferably below about −60° C. Myrcene is an acyclic terpene triene $C_{10}H_{16}$, specifically 7-methyl-3-methylene-1,6-octadiene. It may be considered a conjugated diene with an unsaturated sidechain, viz. the 4-methyl-3-pentenyl radical. In polymerized myrcene a side chain of this unit structure is believed to be attached to each repeating unit of the elastomeric polymer block.

Myrcene, when highly pure, i.e. with far less than one percent of impurities, is satisfactory for use in the invention, though expensive. Commercial myrcene, of 90 to 95 percent purity, sometimes contains gel-forming impurities which interfere with formation of a clear, linear triblock polymer. If such are present, they may be removed by brief pre-treatment of the impure myrcene with sodium to destroy gel-formers, followed by simple distillation.

In the polymerization to form the thermoplastic non-elastomeric monovinyl aromatic hydrocarbon block segments A of the triblock polymer, the reaction is controlled by known procedures so that each homopolymeric block has an average molecular weight between 2,000 and 100,000 and a glass transition temperature above 25° C. Preferred ranges are 10,000 to 60,000 and a glass transition temperature above 70° C. With styrene as the monomer, a transition temperature above 85° C. affords optimum thermoplastic behavior and strength. It is preferred that the two monovinyl aromatic hydrocarbon polymer blocks in the triblock polymer be of the same monomer and as nearly equal as possible in molecular weight and glass transition temperature.

For polymerization of the elastomeric myrcene block, the reaction is controlled so that the block molecular weight is between 10,000 and 1,000,000 and the glass transition temperature is below −40° C. Most suitable are molecular weights from 50,000, better 100,000, to 200,000 and a glass transition temperature below about −60° C., in order to impart optimum elastomeric behavior, tack, and tensile strength.

In addition to controlling the molecular structure of each polymeric block, the properties of the final triblock polymer can also be varied as desired by regulating the relative proportions of the blocks A to the myrcene block B. A myrcene content of at least 65 percent of the total is preferred within the range previously stated. The effect of varying all these parameters and proportions will be evident from the examples hereinafter.

The basic conditions which may be controlled during the sequential reactions to achieve these ranges of molecular weight and glass transition temperature are the quantities of each monomer added, the identity and proportion of initiator, the operating temperature, and the identity of the inert diluent. Each reaction stage is adjusted so that essentially no monomer is left unreacted in the mixture when the polymeric block being formed is within the desired range of molecular weight and transition temperature. Procedures for this type of control are known in the art.

The linear triblock polymers made according to the invention are both thermoplastic and elastomeric. They may be molded under heat and pressure and yet are energy absorptive or rubbery without requiring vulcanization or compounding. They exhibit good tensile properties of elongation on stretching and high strength. These qualities alone equal or in some instances exceed those of the thermoplastic elastomeric triblock polymers of styrene and diolefins heretofore known. In addition, uniquely and surprisingly, the triblock polymers of the invention also exhibit a tacky consistency. This property, together with moldability, elasticity, and strength, renders them useful as hot-melt adhesives. The new tripolymers are also soluble in hydrocarbon solvents, such as benzene, a quality which makes them useful in formulating flowable adhesive cements. The new tripolymers are also clear, virtually transparent in the molded state.

These important properties are thought directly attributable to the polymerized myrcene forming the central block in the tripolymers. This behavior of myrcene seems quite unexpected, since on polymerization, a triene monomer such as myrcene, especially one with a long side chain containing a reactive double bond, might have been expected to undergo extensive cross-linking, forming insoluble opaque products. Instead, the polymyrcene block is linear and adds tackiness to the block polymer, as well as elastomeric behavior and strength.

EXAMPLES

A series of sequential polymerizations was carried out on a laboratory scale. In all runs, the initiator was sec-butyl lithium, the diluent benzene, and the temperature 30° C. The monovinyl aromatic hydrocarbon in both the first and third stages of each triblock polymerization was styrene of polymerization grade. The myrcene was commercially available material of 90 percent purity. It was dried by stirring with freshly crushed calcium hydride and distilling. The distillate was then mixed with a dispersion of sodium in wax and redistilled into ampoules at reduced pressure. These were used in the triblock polymerization.

EXAMPLE 1

Polymerization was conducted in an all-glass vessel adapted to be evacuated and heat-sealed and fitted with three ampoules, two containing styrene (7.2 g. each) and the other myrcene (54.4 g.). To start, the initiator solution (0.5256 millimol (g.)) of sec-butyl lithium in cyclohexane (a commercially available mixture) was introduced into the vessel under argon pressure through a sidearm, which was then sealed off. Benzene (550 milliliters) was distilled into the reactor, which was then sealed off from the distillation line under vacuum. The first polymerization step was then carried out by introducing the styrene from one ampoule into the vessel, allowing 12 hours for completion. In the second step, the myrcene was introduced and polymerization continued 10 hours. Then in the third step styrene from the other ampoule was admitted to the reactor, for an additional 12 hours of polymerization. Thereafter the process, which appeared substantially complete, was terminated by adding degassed methanol (3 ml.). The triblock polymer was then coagulated by pouring the reacted mixture into methanol, after which the polymer was separated and dried. The dry product was a tacky linear tripolymer which was both thermoplastic and elastic. It was visually clear and soluble in benzene, tetrahydrofuran, and other common solvents. On testing, it exhibited physical properties closely similar to those of the product of Example 3 in the Tables.

EXAMPLES 2 TO 7

In a series of runs, triblock polymers according to the invention were made by the procedure of Example 1 except that various other proportions of styrene relative to myrcene were used. The proportions for each run are given in Table A. For convenience the proportions are stated in terms first of the molecular weight $\overline{M}_c$ (g./mol.) of the entire triblock polymer and then of the block molecular weights styrene-myrcene-styrene, all figures being calculated from the weights of the monomers used. In all cases, linear triblock polymers were obtained having thermoplasticity, elasticity, solubility and appearance similar to that of the product of Example 1.

For additional characterization, the triblock polymer of each such example was subjected to physical testing by known standard procedures. Total molecular weights were measured two ways for comparison with the calculated value $\overline{M}_c$. The value $\overline{M}_n$ was determined by osmometry, while the value $\overline{M}_w$ was derived by gel phase chromatography. All three molecular weight figures for each example are shown in Table A. Also shown is the value $\overline{M}_B/\overline{M}_A$ derived as the quotient of $\overline{M}_B$ (the block molecular weight of the myrcene block) divided by $\overline{M}_A$ (the total molecular weight of the two styrene blocks), all such weights being calculated from the known quantities of the monomers used. The ratio $\overline{M}_B/\overline{M}_A$ indicates the relative proportions of myrcene and styrene.

Further given in Table A is the yield of polymer (calculated from the weight of triblock polymer obtained relative to the weight of the monomers used). In addition, there is shown the weight percent of styrene in the final polymer, both as calculated from the starting materials and as measured experimentally by known NMR spectroscopic techniques.

Other tests on the same examples are reported in Table B. The glass transition temperatures $T_g$ of the blocks of myrcene and of styrene in the triblock polymer were measured by differential scanning calorimetry (DSC). The intrinsic viscosity $[\eta]$ was determined by conventional method. Tensile tests were performed on a portion of each triblock polymer molded into a sheet and then die-cut into a standard test "dumbbell" bar which was stretched to the breakpoint on an Instron tester. Reported in Table B are the elongation at break (as a percent of original length) and tensile strength ($MP_a$, megapascals).

From Table A it will be observed that the measured molecular weights $\overline{M}_n$ and $\overline{M}_w$ are nearly equal in all samples. This close correspondence is indicative of low polydispersity. The triblock polymers are thus essentially linear, termination and transfer free.

While tackiness was not measured numerically, it was noted that the degree of tackiness increased significantly as the proportion of myrcene in the triblock polymer increased.

TABLE B

| Example | $T_{g(DSC)}$(°C.) B | $T_{g(DSC)}$(°C.) A | $[\eta]$ (dl/g) | Elongation % | Tensile Strength (MPa) |
|---|---|---|---|---|---|
| 2 | −63 | 103 | 0.815 | 670 | 12.8 |
| 3 | −60 | 87 | 1.065 | 1200 | 4.3 |
| 4 | −61 | 95 | 0.853 | 1290 | 7.0 |
| 5 | −62 | 95 | 0.714 | 1000 | 9.2 |
| 6 | −63 | 85 | 0.683 | 580 | 3.5 |
| 7 | −63 | 85 | 0.495 | 340 | 3.6 |

I claim:

1. A solvent soluble clear thermoplastic elastomeric linear triblock polymer of a monovinyl aromatic hydrocarbon and myrcene corresponding to the general formula A-B-A in which each A is a nonelastic linear homopolymer block of a monovinyl aromatic hydrocarbon having an average molecular weight between 10,000 and 60,000 and a glass transition temperature above 70° C., B is an elastomeric homopolymeric block of myrcene having an average molecular weight between 50,000 and 200,000 and a glass transition temperature below about −40° C., and B constitutes between about 40 and about 80 percent by weight of the total, the tripolymer exhibiting tacky consistency.

2. A triblock polymer according to claim 1 in which each A block is polystyrene having a glass transition temperature of at least 85° C. and the B myrcene block has a glass transition temperature below about −60° C.

3. A thermoplastic elastomeric linear triblock polymer of styrene and myrcene corresponding to the general formula A-B-A in which each A block is a non-elastic linear homopolymer block of polystyrene having an average molecular weight between 10,000 and 60,000 and a glass transition temperature of at least 85° C., B is an elastomeric homopolymeric block of myrcene having an average molecular weight from above 100,000 to 200,000 and a glass transition temperature below about −60° C., and B constitutes from at least 65 to about 80 percent by weight of the total, the tripolymer being soluble in benzene and clear when molded, exhibiting a tacky consistency and being useful as a hot-melt adhesive.

* * * * *

TABLE A

| Example | $\overline{M}_c \times 10^{-3}$ (g/mol) | $\overline{M}_n \times 10^{-3}$ (g/mol) | $\overline{M}_w \times 10^{-3}$ (g/mol) | $\overline{M}_B/\overline{M}_A$ | Polymer Yield % | Styrene - wt. % calcd. | Styrene - wt. % exptl. |
|---|---|---|---|---|---|---|---|
| 2 | 190 (55-80-55) | 187 | 194 | 0.73 | 91 | 57.9 | 58.1 |
| 3 | 180 (20-140-20) | 190 | 210 | 3.50 | 88 | 22.2 | 23.1 |
| 4 | 170 (30-110-30) | 194 | 186 | 1.83 | 90 | 35.3 | 36.0 |
| 5 | 150 (30-90-30) | 165 | 157 | 1.50 | 89 | 40.0 | 41.2 |
| 6 | 110 (17-76-17) | 130 | 125 | 2.24 | 88 | 31.2 | 32.6 |
| 7 | 80 (14-52-14) | 92 | 85 | 1.86 | 89 | 35.0 | 35.5 |